(12) United States Patent
Hickey (10) Patent No.: US 12,191,518 B2
(45) Date of Patent: Jan. 7, 2025

(54) ACTIVE THERMAL MANAGEMENT SYSTEMS WITH MULTI-PURPOSE RESERVOIRS FOR LIQUID IMMERSION COOLED BATTERY ASSEMBLIES

(71) Applicant: GM GLOBAL TECHNOLOGY OPERATIONS LLC, Detroit, MI (US)

(72) Inventor: Ryan P. Hickey, Austin, TX (US)

(73) Assignee: GM Global Technology Operations LLC, Detroit, MI (US)

( * ) Notice: Subject to any disclaimer, the term of this patent is extended or adjusted under 35 U.S.C. 154(b) by 381 days.

(21) Appl. No.: 17/713,484

(22) Filed: Apr. 5, 2022

(65) Prior Publication Data

US 2023/0318118 A1     Oct. 5, 2023

(51) Int. Cl.
| | | |
|---|---|---|
| *H01M 50/317* | (2021.01) | |
| *B60L 58/26* | (2019.01) | |
| *H01M 10/625* | (2014.01) | |
| *H01M 10/63* | (2014.01) | |

(Continued)

(52) U.S. Cl.
CPC ........... *H01M 50/317* (2021.01); *B60L 58/26* (2019.02); *H01M 10/625* (2015.04); *H01M 10/63* (2015.04); *H01M 10/6567* (2015.04); *H01M 50/3425* (2021.01); *H01M 2220/20* (2013.01)

(58) Field of Classification Search
CPC .. H01M 50/317; H01M 10/625; H01M 10/63; H01M 10/6567; H01M 50/3425; H01M 2220/20; H01M 10/613; H01M 10/6568; B60L 58/26; B60L 3/0046; B60L 50/64; Y02E 60/10; B60K 1/04; B60K 2001/005
See application file for complete search history.

(56) References Cited

U.S. PATENT DOCUMENTS

| | | |
|---|---|---|
| 4,350,026 A | 9/1982 | Klein |
| 6,889,515 B2 | 5/2005 | Tilton et al. |
| 6,955,063 B2 | 10/2005 | Adiga et al. |

(Continued)

FOREIGN PATENT DOCUMENTS

| | | |
|---|---|---|
| CN | 110335973 | * 10/2019 |
| DE | 102019121308 A1 | 2/2021 |

(Continued)

*Primary Examiner* — Lisa S Park
(74) *Attorney, Agent, or Firm* — Quinn IP Law (57) ABSTRACT

Presented are active thermal management (ATM) systems with multi-purpose reservoirs for liquid-immersion cooled battery assemblies, methods for making/using such systems, and motor vehicles equipped with such systems. An ATM system for a battery assembly includes a coolant reservoir that stows a liquid immersion cooling (LIC) fluid, and an inlet manifold that fluidly connects the reservoir to the battery assembly's battery case to transfer LIC fluid into an immersion compartment within the battery case. An outlet manifold fluidly connects the battery case to the reservoir to transfer fluid out from the immersion compartment. An auxiliary vent manifold selectively fluidly connects the battery case to the reservoir responsive to a predefined thermal event to thereby transfer LIC fluid and battery cell vent gases from the immersion compartment to the reservoir. A gas valve, which is fluidly connected to the reservoir, selectively evacuates therefrom the vent gases at a predefined internal reservoir pressure.

20 Claims, 3 Drawing Sheets

(51) Int. Cl.
*H01M 10/6567* (2014.01)
*H01M 50/342* (2021.01)

(56) References Cited

U.S. PATENT DOCUMENTS

| | | | |
|---|---|---|---|
| 8,329,325 | B2 | 12/2012 | Brodie et al. |
| 8,383,260 | B2 | 2/2013 | Essinger et al. |
| 8,435,668 | B2 | 5/2013 | Kumar et al. |
| 8,563,154 | B2 | 10/2013 | Graban et al. |
| 8,852,772 | B2 | 10/2014 | McDonald |
| 10,923,287 | B1 | 2/2021 | Coppola et al. |
| 2009/0249807 | A1 | 10/2009 | Nemesh et al. |
| 2011/0200860 | A1 | 8/2011 | Brodie et al. |
| 2012/0090348 | A1* | 4/2012 | O'Rourke .......... H05K 7/20927 62/434 |
| 2012/0129024 | A1* | 5/2012 | Marchio ............. H01M 10/647 429/120 |
| 2014/0342197 | A1* | 11/2014 | Andres ................ H01M 10/653 429/120 |
| 2014/0342201 | A1* | 11/2014 | Andres ................ H01M 50/682 165/80.4 |
| 2017/0207505 | A1* | 7/2017 | Joswig .................... F16L 33/02 |
| 2018/0048037 | A1* | 2/2018 | Newman ........... H01M 10/6561 |
| 2018/0287156 | A1 | 10/2018 | Yu |
| 2019/0357386 | A1 | 11/2019 | Coppola et al. |
| 2021/0218004 | A1 | 7/2021 | Morr |
| 2022/0102780 | A1 | 3/2022 | Hickey et al. |
| 2023/0066160 | A1* | 3/2023 | Dorresteyn ....... H01M 10/6554 |
| 2023/0238632 | A1 | 7/2023 | Kritzer |

FOREIGN PATENT DOCUMENTS

| | | |
|---|---|---|
| DE | 102019007737 A1 | 5/2021 |
| JP | 2007157633 A | 6/2007 |
| KR | 20210011262 A | 2/2021 |
| KR | 20220132353 A | 9/2022 |

* cited by examiner

FIG. 4

ACTIVE THERMAL MANAGEMENT SYSTEMS WITH MULTI-PURPOSE RESERVOIRS FOR LIQUID IMMERSION COOLED BATTERY ASSEMBLIES

INTRODUCTION

The present disclosure relates generally to electrochemical devices. More specifically, aspects of this disclosure relate to active thermal management systems for regulating the operating temperatures of liquid immersion cooled battery assemblies.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

High-voltage (HV) electrical systems govern the transfer of electricity between the traction motors and the rechargeable battery packs that supply the requisite power for operating many hybrid-electric and full-electric powertrains. To provide the power capacity and energy density needed to propel a vehicle for a practical range, contemporary traction battery packs group stacks of battery cells (e.g., 8-16+ cells/stack) into individual battery modules (e.g., 10-40+ modules/pack) that are electrically interconnected in series or parallel and mounted onto the vehicle chassis, e.g., by a battery pack housing or support tray. Located on a battery side of the HV electric system is a front-end DC-to-DC power converter that is electrically connected to the traction battery pack(s) in order to increase the supply of voltage to a main DC bus and a DC-to-AC power inverter module (PIM). A high-frequency bulk capacitor may be arranged across the positive and negative terminals of the main DC bus to provide electrical stability and store supplemental electrical energy. A dedicated Electronic Battery Control Module (EBCM), through collaborative operation with a Powertrain Control Module (PCM) and each motor's power electronics package, governs operation of the battery pack(s) and traction motor(s).

The individual cells of a battery pack may generate a significant amount of heat during the pack's charge and discharge cycles. This cell-borne heat is produced primarily by exothermic chemical reactions and losses due to activation energy, chemical transport, and resistance to ionic migration. Within lithium-ion batteries, a series of exothermic and gas-generating reactions may take place as cell temperatures rise and the battery assembly is pushed towards an unstable state. Such thermal events, if left unchecked, may lead to a more accelerated heat-generating state called "thermal runaway", a condition in which the battery system is incapable of returning the internal battery components to a normal operating temperature. An integrated battery cooling system may be employed to prevent these undesirable overheating conditions within such battery packs. Active thermal management (ATM) systems, for example, employ a central controller or dedicated control module to regulate operation of a cooling circuit that circulates coolant fluid through the heat-producing battery components. For indirect liquid cooling systems, a heat-transfer coolant is circulated through a network of internal channels and pipes within the battery case. In contrast, direct liquid cooling systems—or "liquid immersion cooling" (LIC) systems—immerse the battery cells within a direct-conduction liquid dielectric coolant.

SUMMARY

Presented herein are thermal management systems with multi-purpose dielectric fluid reservoirs for liquid-immersion cooled battery assemblies, methods for manufacturing and methods for operating such systems, and electric-drive vehicles equipped with such systems for cooling lithium-class traction battery packs. By way of example, there are disclosed active thermal management systems with multi-purpose reservoirs for coolant back flow and vent gas release of LIC battery assemblies. During a thermal runaway (TR) event, dielectric immersion fluids circulating through the battery case of a lithium-ion battery assembly may mix with vent gasses released from the overheating battery cells. To mollify thermal runaway using direct liquid cooling, these vent gases are evacuated from the battery case's internal immersion compartment without allowing leakage of the immersion fluid. A large-diameter vent manifold acts as an auxiliary fluidly coupling between the battery enclosure and a main dielectric reservoir, which acts as both a backflow tank to prevent fluid loss while providing pressure-activated vent gas evacuation. A frangible burst vent may be placed upstream from the dielectric reservoir, e.g., interposed between the vent manifold and battery module; when the burst vent ruptures, e.g., from pressure during a TR event, dielectric immersion fluid and vent gas flow to the main reservoir. Immersion fluid is recirculated back into the ATM system while a pressure-activated vent valve on the reservoir allows captured vent gases to escape.

Attendant benefits for at least some of the disclosed concepts include an integrated LIC battery cooling system that eliminates inadvertent loss of dielectric immersion fluid flow from a rechargeable battery assembly due to fluid leakage during a thermal runaway event. Disclosed ATM system architectures provide pressure-regulated vent-gas evacuation while minimizing immersion cooling fluid losses. In addition, disclosed systems and methods may employ a secondary, increased-diameter and increased-length vent manifold to transport vent gases and coolant fluids to the main reservoir and, in so doing, reduce vent gas temperatures before the gas is expelled from the system. Use of a burst vent helps to maintain immersion coolant pressure and flow during normal battery operating conditions. With more coolant in the thermal management system, cooling efficacy is improved with a concomitant increase in battery capacity, which leads to improvements in overall vehicle efficiency and increased driving range.

Aspects of this disclosure are directed to thermal management systems with multi-purpose dielectric fluid reservoirs for liquid-immersion cooled battery assemblies. In an example, there is presented an ATM system for regulating the operating temperature of a battery assembly. The battery assembly includes a battery case with an immersion compartment that is liquid-tight (i.e., holds a pool of liquid while preventing inadvertent escape of the liquid); this compartment contains one or more battery cells each being at least partially submerged in a liquid immersion cooling fluid. The ATM system includes a coolant reservoir that stows therein the LIC fluid, a coolant inlet manifold that fluidly connects the coolant reservoir to the battery case, and a coolant outlet manifold that fluidly connects the battery case to the coolant reservoir. The inlet manifold, which is fluidly downstream from the reservoir, transfers the LIC fluid into the immersion compartment. Comparatively, the outlet manifold is fluidly downstream from the immersion compartment and designed to transfer the LIC fluid into the reservoir. An auxiliary vent manifold selectively fluidly connects the battery case to the coolant reservoir, e.g., responsive to a predefined thermal event, to thereby transfer LIC fluid and battery cell vent gases from the immersion compartment into the coolant reservoir. A gas valve, which is fluidly connected to the coolant reservoir, selectively evacuates vent gases from the reservoir at a predefined internal reservoir pressure.

Additional aspects of this disclosure are directed to motor vehicles with LIC-type ATM systems for cooling lithium-class traction battery packs. As used herein, the terms "vehicle" and "motor vehicle" may be used interchangeably and synonymously to include any relevant vehicle platform, such as passenger vehicles (ICE, REV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. For non-automotive applications, disclosed concepts may be implemented for any logically relevant use, including stand-alone power stations and portable power packs, photovoltaic systems, pumping equipment, machine tools, personal electronic devices, appliances, etc. While not per se limited, disclosed concepts may be particularly advantageous for use with lithium-ion polymer, pouch-type traction battery packs.

In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, one or more electric traction motors operate alone (e.g., for FEV powertrains) or in conjunction with an internal combustion engine assembly (e.g., for HEV powertrains) to selectively drive one or more of the road wheels to propel the vehicle. A rechargeable traction battery pack is mounted onto the vehicle body and operable to power the traction motor(s). In addition to the traction battery pack and motor, the vehicle includes other heat-generating devices that are cooled by the ATM system.

Continuing with the discussion of the preceding example, the traction battery pack includes a battery case with a liquid-tight immersion compartment that contains multiple lithium-class battery cells, which are at least partially submerged in an LIC fluid. The vehicle employs an active thermal management with a main coolant reservoir for stowing the LIC fluid. Downstream from the coolant reservoir is a coolant inlet manifold that fluidly connects the reservoir to the battery case in order to transfer the LIC fluid into the immersion compartment. Upstream from the coolant reservoir is a coolant outlet manifold that fluidly connects the battery case to the reservoir in order to transfer the LIC fluid out from the immersion compartment. During thermal runaway or other predefined thermal event, an auxiliary vent manifold selectively fluidly connects the battery case to the coolant reservoir to thereby transfer LIC fluid and battery cell-generated vent gases out of the immersion compartment and to the coolant reservoir. A gas valve is fluidly coupled to the coolant reservoir to selectively evacuate therefrom vent gases at a predefined internal reservoir pressure.

Aspects of this disclosure are also directed to ATM system control logic, manufacturing workflow processes, and computer-readable media (CRM) for making and/or operating an ATM system of a battery assembly. In an example, a method is presented for assembling an active thermal management system. This representative method includes, in any order and in any combination with any of the above and below disclosed options and features: receiving a coolant reservoir configured to stow therein an LIC fluid; fluidly connecting the coolant reservoir to a battery case via a coolant inlet manifold, the coolant inlet manifold configured to transfer the LIC fluid from the coolant reservoir into an internal immersion compartment within the battery case; fluidly connecting the battery case to the coolant reservoir via a coolant outlet manifold, the coolant outlet manifold configured to transfer the LIC fluid out from the immersion compartment; selectively fluidly connecting the battery case to the coolant reservoir responsive to a predefined thermal event via an auxiliary vent manifold, the auxiliary vent manifold configured to transfer the LIC fluid and vent gases generated by the battery cell from the immersion compartment to the coolant reservoir; and fluidly connecting a gas valve to the coolant reservoir, the gas valve configured to selectively evacuate the vent gases from the coolant reservoir at a predefined internal reservoir pressure.

For any of the disclosed systems, methods, and vehicles, the coolant outlet manifold may be fabricated with an outlet (first) manifold body with a cylindrical shape and a respective (first) diameter. In the same vein, the auxiliary vent manifold may be fabricated with a vent (second) manifold body having a cylindrical shape and a respective (second) diameter that is greater than the diameter of the outlet manifold body. As another option, the coolant outlet manifold has a total (first) conduit length that extends from the battery case to the coolant reservoir (including any interconnecting fluid conduits). In this instance, the auxiliary vent manifold has a total (second) conduit length, which extends from the battery case to the coolant reservoir (including any interconnecting fluid conduits), which is markedly larger than the outlet manifold's total conduit length.

For any of the disclosed systems, methods, and vehicles, the auxiliary vent manifold may be fabricated with a burst vent that inhibits fluid flow through the auxiliary vent manifold prior to occurrence of a predefined thermal event. The burst vent may include a frangible burst disc that is sealingly connected to a fluid port of the auxiliary vent manifold; the burst disc is structurally configured to rupture or otherwise fail at a predefined internal pressure of the immersion compartment that results from the predefined thermal event. In a more specific example, the auxiliary vent manifold includes one or more fluid inlet ports interposed between the auxiliary vent manifold and the immersion compartment; a frangible burst disc may be sealed over each of these inlet ports.

For any of the disclosed systems, methods, and vehicles, the gas valve includes a passive-type, spring-biased valve, i.e., the operational state of the valve—open or closed—is determined by fluid pressure generated by the LIC fluid and battery vent gases. In a specific example, the gas valve is a flapper valve with a flapper diaphragm that sealingly seats onto an exterior surface of the coolant reservoir cover and is biased closed by a helical expansion spring. The coolant reservoir may be fabricated with a reservoir body that includes a reservoir basin, within which is stowed the LIC fluid, and a reservoir cover, which extends across and closes the reservoir basin. In this instance, the gas valve may be mounted to the reservoir cover. The reservoir body, including the basin and cover, may be fabricated as a single-piece, unitary structure. As a further option, a fluid outlet port of the auxiliary vent manifold is fluidly connected via a vent conduit to an upper portion of the reservoir body such that the LIC fluid separates from the vent gases and drains into the reservoir basin.

For any of the disclosed systems, methods, and vehicles, the ATM system may incorporate a liquid pump that is fluidly connected to the coolant reservoir and operable to circulate LIC fluid through the inlet manifold and into the battery case to thereby partially or fully submerge the battery cell(s) in the LIC fluid. The battery assembly may be a traction battery pack or module that is mounted to a vehicle chassis; in this instance, the gas valve evacuates vent gases from the vehicle. The vehicle may include an assortment of heat-generating powertrain components; the ATM system may employ an array of fluid conduits to fluidly connect the coolant reservoir to these heat-generating powertrain components to transfer thereto the LIC fluid. As yet a further option, the predefined thermal event includes a thermal runaway event with a resultant TR fluid pressure within the immersion compartment; this buildup of TR pressure causes the auxiliary vent manifold to fluidly connect the battery case to the coolant reservoir (e.g., by rupturing the frangible burst discs and opening one or more fluid inlet ports into the auxiliary vent manifold).

The above Summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Figure 1:
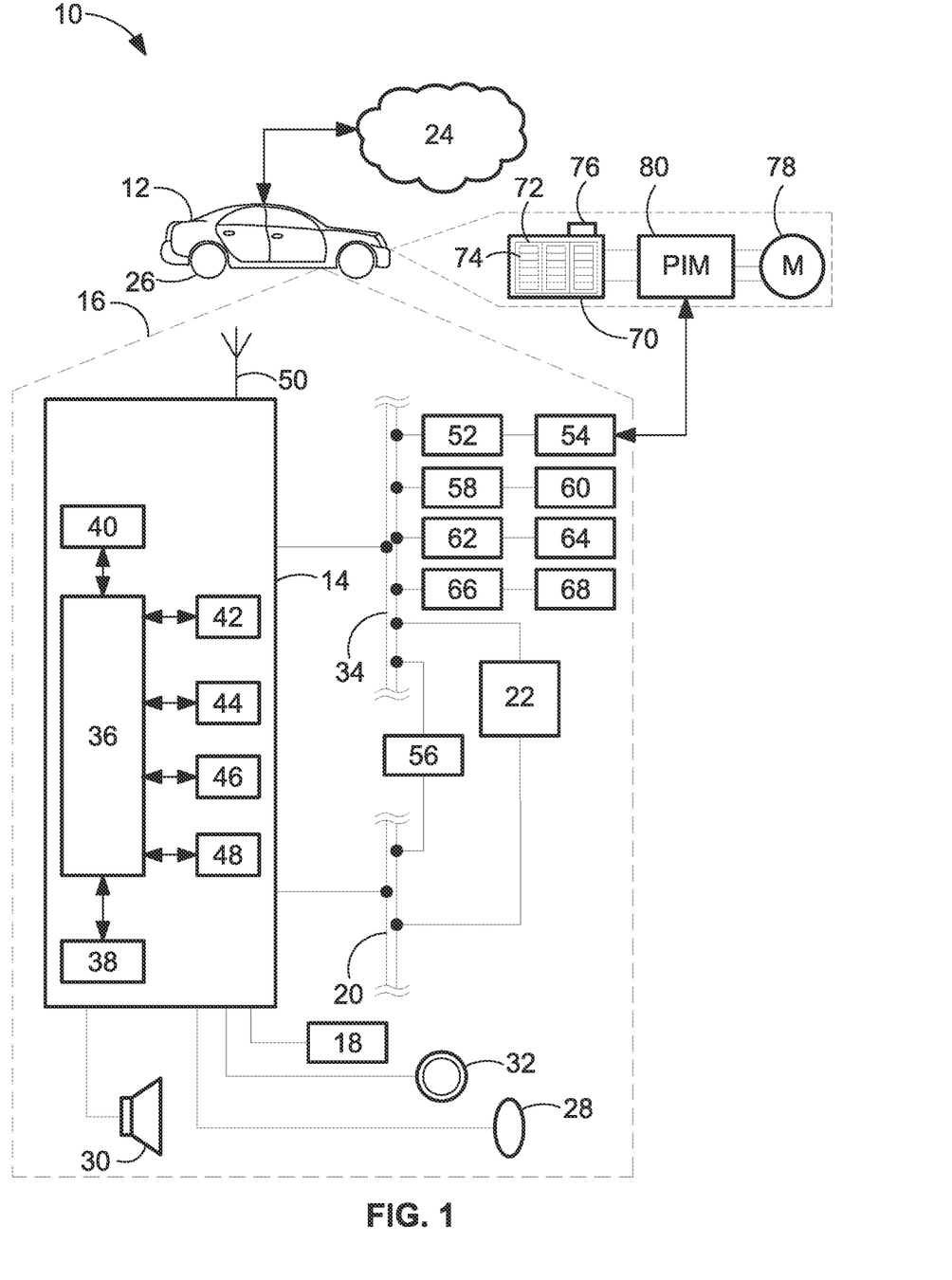
FIG. 1 is a partially schematic, side-view illustration of a representative motor vehicle with an electrified powertrain, a rechargeable traction battery pack, and an active thermal management system for regulating the operating temperatures of various heat-generating components in accordance with aspects of the disclosed concepts.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which novel aspects of this disclosure may be practiced. In the same vein, incorporation of the present concepts into an FEV powertrain should be appreciated as a non-limiting implementation of disclosed features. As such, it will be understood that aspects and features of this disclosure may be applied to other powertrain architectures, incorporated into any logically relevant type of motor vehicle, and utilized for both automotive and non-automotive applications alike. Moreover, only select components of the motor vehicles, battery assemblies, and thermal systems are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunications and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speakers 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal or other auditory commands; the vehicle 10 may be equipped with an embedded voice-processing unit utilizing audio filtering, editing, and analysis modules. Conversely, the speakers 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. Other appropriate communication interfaces may include those that conform with ISO, SAE, and/or IEEE standards and specifications. The network connection interface 34 enables vehicle hardware 16 to send and receive signals with one another and with various systems and subsystems both onboard and off-board the vehicle body 12. This allows the vehicle 10 to perform assorted vehicle functions, such as modulating powertrain output, governing operation of a vehicle transmission, activating friction and regenerative brake systems, controlling vehicle steering, regulating charge and discharge of a vehicle battery pack, and other automated functions. For instance, telematics unit 14 may receive and transmit signals to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range vehicle communication capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components or, optionally, may include additional components and functionality as desired for a particular end use. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, e.g., for executing an automated vehicle operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automation and concomitant autonomous vehicle operation.

To propel the motor vehicle 10, an electrified powertrain is operable to generate and deliver tractive torque to one or more of the vehicle's drive wheels 26. The powertrain is generally represented in FIG. 1 by a rechargeable energy storage system (RESS), which may be in the nature of a chassis-mounted traction battery pack 70, that is operatively connected to an electric traction motor (M) 78. The traction battery pack 70 is generally composed of one or more battery modules 72 each having a stack of battery cells 74, such as lithium-class, zinc-class, nickel-class, or organosilicon-class battery cells of the pouch, can, or prismatic type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. Disclosed concepts are similarly applicable to HEV and ICE-based powertrains.

The battery pack 70 may be configured such that module management, cell sensing, and module-to-module or module-to-host communication functionality is integrated directly into each battery module 72 and performed by an integrated electronics package, such as a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the cell module assembly.

Figure 2:
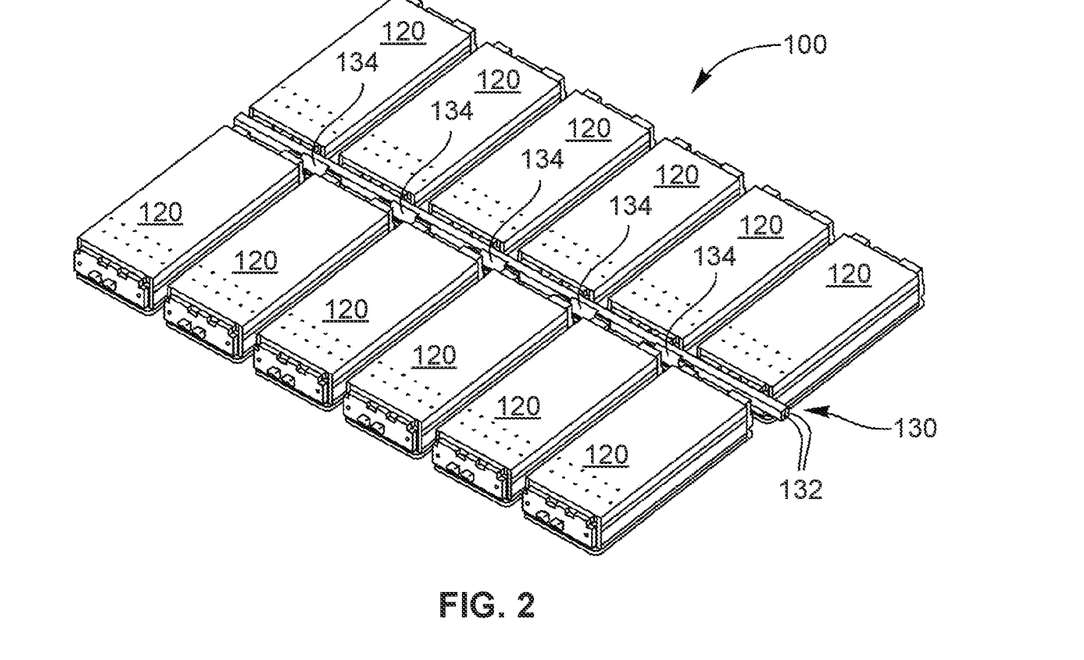
FIG. 2 is an elevated, perspective-view illustration of a representative battery pack cooled by a direct liquid cooling system in accord with aspects of this disclosure.
Figure 3:
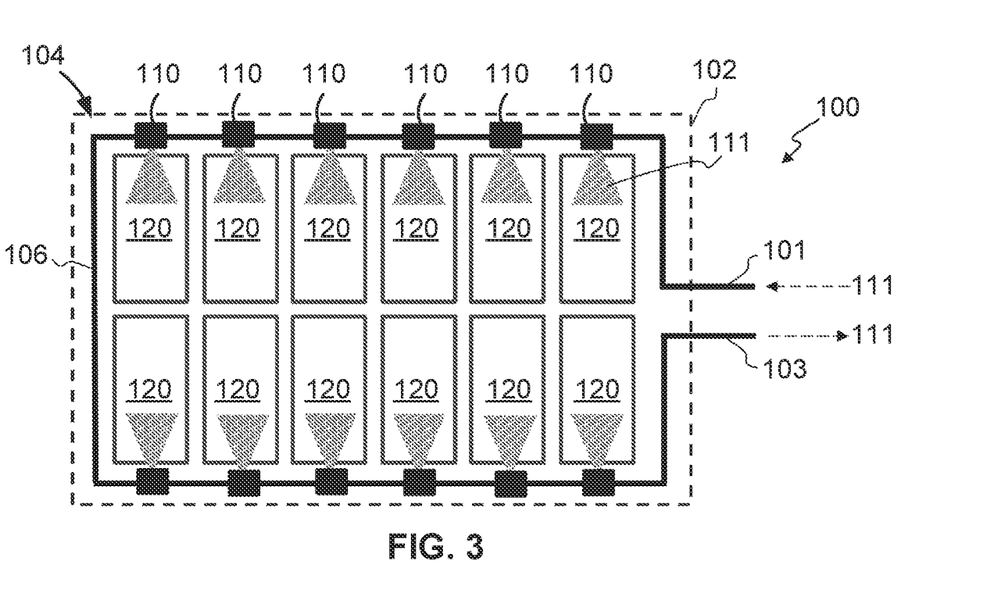
FIG. 3 is a schematic diagram of the representative battery pack and direct liquid cooling system of FIG. 2.

FIG. 2 presents a more detailed depiction of select components of a representative battery pack 100 assembly, which may be incorporated into the automobile 10 of FIG. 1, e.g., for powering the traction motor 78, or implemented for a non-automotive application, e.g., for powering a residential or commercial power pack. In this non-limiting example, a rectangular array of battery modules 120, each containing a stack of battery cells (e.g., battery cells 74 of FIG. 1), is enclosed within a protective battery case 102 (FIG. 3). The battery case 102 may be constructed of a metallic, polymeric, or fiber-reinforced polymer material, including combinations thereof, to satisfy various mechanical and/or thermal design specifications. The battery pack 100 may have a relatively flat and generally rectangular shape, as shown, or may be arranged in a T-configuration or other application-specific shape. Likewise, the battery pack 100 may contain stacks of lithium-ion polymer pouch cells that are segregated into discrete battery modules 120, as shown, or may contain prismatic or can-type battery cells, may employ any suitable battery technology, and/or may be stored in a shared compartment inside the battery case 102.

Under anomalous operating conditions, the battery pack 100 may become damaged or may malfunction in a manner that causes excessive heat (e.g., 400-500+° C.) to be generated by cells inside the battery modules 120. FIG. 3 schematically illustrates the battery pack 100 with an active thermal management (ATM) system 104 that helps to regulate the operating temperatures of the battery modules 120 during normal charge and discharge of the pack 100 and during such high-heat thermal events. The ATM system 104 of FIG. 3 includes a coolant line 106 with coolant inlet and outlet ports 101 and 103, respectively, that penetrate the outer perimeter of the battery case 102. In the illustrated example, the ATM system 104 employs one or more liquid injection valves 110 that are passively or actively actuated to inject a dielectric immersion coolant liquid 111 (also referred to as "liquid immersion cooling fluid" or "coolant" for brevity) into the battery case 102. Each valve 110 may spray dielectric immersion coolant liquid 111 onto a respective battery module 120 to partially or fully submerge the module in the coolant 111, e.g., responsive to a temperature within the battery case 102 exceeding a pack-calibrated maximum temperature threshold. This temperature threshold may be a memory-stored TR temperature at which thermal runaway is predicted to occur within the battery pack 100.

The coolant line 106 of FIG. 3 may be biased towards the periphery of the battery case 102, as shown, may be biased towards the center of the battery case 102, or may take various other routes throughout the battery case 102. Rather than spray coolant liquid 111 onto and at least partially submerge the battery modules 120, as shown in FIG. 3, the ATM system 104 may fill the individual battery modules 120 with coolant liquid 111, as described below for FIG. 4, or may altogether omit the individual module housings such that spraying coolant liquid 111 into the case 102 will partially/fully submerge the battery cells. The coolant line 106 may additionally circulate coolant through assorted components packaged in or on the battery pack 100. For example, battery pack 100 contains a backplane assembly 130 that is positioned between select rows of battery modules 120 in contact with an electrical busbar 134 appurtenant each of the battery modules 120. The backplane assembly 130 may provide a "drop in" module racking structure with quick-connect electrical contacts for physically attaching the modules 120 to the battery case 102 and electrically coupling the modules 210 with the busbar 134. Coolant 111 may be diverted from coolant line 106 into one or more internal conduits 132 of the backplane 130, for example, to facilitate cooling or heating of the battery pack 100.

Figure 4:
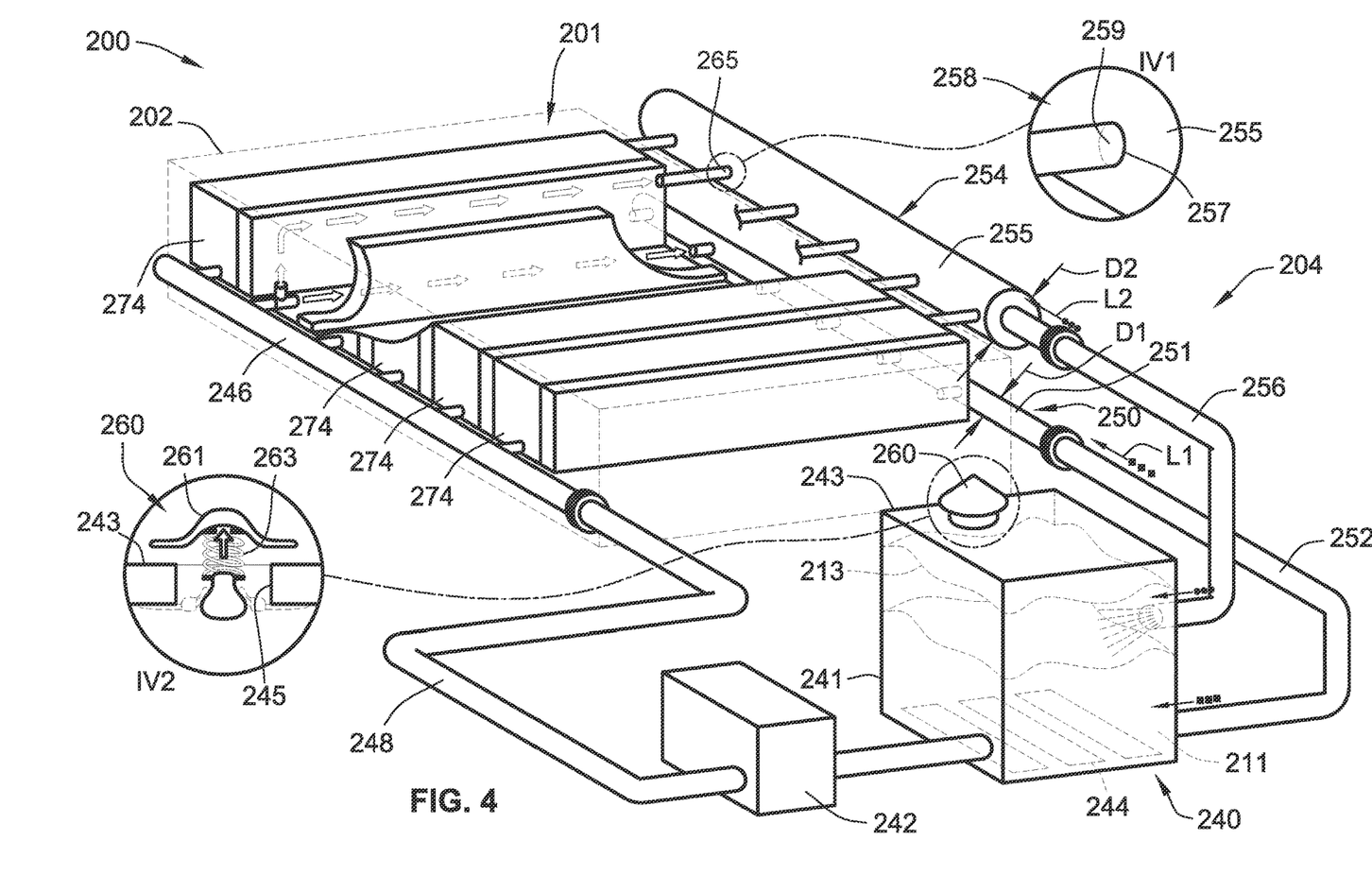
FIG. 4 is a partially schematic, perspective view illustration of a representative liquid-immersion cooling system (LIC) with a multi-purpose dielectric fluid reservoir for regulating the operating temperature of a battery assembly during a predefined thermal event in accordance with aspects of the disclosed concepts.

Turning next to FIG. 4, there is shown another representative example of a battery assembly, namely a rechargeable battery module 200 assembly, with an active thermal management system, portrayed as a liquid immersion cooling system 204, for maintaining an operating temperature of the assembly within a predefined "acceptable" temperature range. While differing in appearance, it is envisioned that any of the features and options described above with respect to the battery pack 100 and ATM system 104 of FIGS. 2 and 3 may me incorporated, singly and in any combination, into the battery module 200 and LIC system 204 of FIG. 4, and vice versa. As a non-limiting point of similarity, the battery module 200 contains a stack of lithium-ion polymer battery cells 274 that is operatively housed within a protective outer case 202. In addition, both thermal management systems 104 and 204 of FIGS. 3 and 4 use direct liquid cooling techniques to cool the heat-generating electrochemical cells encased within the respective battery assemblies 100, 200. Within the battery module case 202 of FIG. 4, for example, is a liquid-tight immersion compartment 201 that holds a pool of dielectric liquid coolant and encloses the battery cells 274 such that they are kept partially or completely submerged in the dielectric liquid coolant during operation of the module 200.

The LIC system 204 of FIG. 4 is equipped with a main coolant reservoir 240 (also referred to as "vehicle dielectric reservoir") for stowing a dielectric liquid immersion cooling fluid 211. In accord with the illustrated example, the main coolant reservoir 240 is a fluid-tight polymeric container that stores and disseminates LIC fluid 211 to the battery module 200 and, for automotive applications, other heat-generating components distributed throughout the vehicle (e.g., CMU/battery electronics package 76 and traction motor 78). As shown, the main coolant reservoir 240 of FIG. 4 may be manufactured with a single-piece or bipartite reservoir body that is defined by a reservoir basin 241 and a reservoir cover 243 adjoining the basin 241. The reservoir basin 241 collects and retains the LIC fluid 211, whereas the reservoir cover 243 extends across and closes off the reservoir basin 241 such that vent gases 213 are trapped between the pooled LIC fluid 213 and the cover 243. To selectively heat and/or cool the LIC fluid 211, a heating element or a heat sink (collectively represented at 244 in FIG. 4) may be disposed inside the main coolant reservoir 240, as shown, or may be mounted to or separately fluidly coupled with the main coolant reservoir 240. An electronic liquid pump 242 is fluidly coupled to the coolant reservoir 240 and selectively activated (e.g., via EBCM 56 or CMU/integrated electronics package 76 of FIG. 1) to circulate LIC fluid 211 to and from the reservoir 240 and, concomitantly, into and out of the battery module case 202 in order to partially or fully submerge the Li—Po battery cells 274 in the LIC fluid 211.

A thermal fluid loop—typified by an interconnected network of pipes, hoses, channels, and/or other fluid conduits—facilitates the distribution of LIC fluid 211 throughout the LIC system 204. Located fluidly downstream from the main coolant reservoir 240, for example, are a coolant inlet manifold 246 and a coolant inlet conduit 248 that, together, fluidly connect the coolant reservoir 240 to the battery module case 202. When the pump 242 is activated, LIC fluid 211 is transferred from the reservoir 240, through the coolant inlet conduit 248, and into the coolant inlet manifold 246, which then disseminates the coolant 211 throughout the immersion compartment 201 inside the battery module case 202. Located fluidly upstream from the main coolant reservoir 240 are a coolant outlet manifold 250 and a coolant outlet conduit 252 that, together, fluidly connect the battery module case 202 to the coolant reservoir 240. By activating the pump 242, LIC fluid 211 is pushed out of the battery case's internal immersion compartment 201 and accumulates in the coolant outlet manifold 250. From there, the LIC fluid 211 passes through the coolant outlet conduit 252 and into the reservoir 240. While portrayed in FIG. 4 as bipartite sections of the thermal fluid loop, the inlet section (i.e., coolant inlet manifold and conduit 246, 248) and outlet section (i.e., coolant outlet manifold and conduit 250, 252) may each be fabricated as a single-piece component or, alternatively, may be assembled from three or more individual parts.

During a thermal runaway event, vent gases released by overheating electrochemical cells will mix with and, in so doing, heat and expand the dielectric liquid immersion coolant inside the immersion compartment 201. To mitigate thermal runaway using liquid immersion cooling, the LIC system 204 expels these vent gases from the immersion compartment 201 without allowing leakage of the LIC fluid 211. Upon occurrence of any such thermal event, an auxiliary vent manifold 254 (also referred to as "hot gas manifold") selectively fluidly connects the battery module case 202 to the main coolant reservoir 240 to thereby transfer the heated and expanding LIC fluid 211 with any entrained vent gases 213 out of the immersion compartment 201 and into the coolant reservoir 240. In this instance, the battery module case 202 may be characterized by a lack of air exhaust vents that allow vent gases to escape directly from the battery module 200 assembly to the surrounding environment. Were the battery module cases 202 to include air exhaust vents, like those incorporated into passively cooled and indirect liquid cooled battery assemblies, the heated and expanding vent gases and LIC fluid may violently erupt from the battery assembly 200 to the surrounding environment.

The auxiliary vent manifold 254 of FIG. 4 may be structurally configured to slow and cool the cell-generated vent gases 213 before these gases 213 are ejected from the LIC system 204. By way of example, and not limitation, the coolant outlet manifold 250 is fabricated with an outlet manifold body 251 (also referred to herein as "first cylindrical manifold body") that has a cylindrical shape and a respective (first) diameter D1. Contrastingly, the auxiliary vent manifold 254 is fabricated with a vent manifold body 255 (also referred to herein as "second cylindrical manifold body") that has a cylindrical shape and a respective (second) diameter D2. The diameter D2 of the vent manifold body 255 is markedly larger (e.g., 2×-3×+ greater) than the diameter D1 of the outlet manifold body 251 to allow the LIC fluid 211 and vent gases 213 exiting the battery module case 202 to expand and, thus, depressurize and cool before transfer to the reservoir 240.

To increase fluid cooling prior to vent gas expulsion from the LIC system 104, the auxiliary vent manifold 254 provides a supplemental exit route with an extended route length that expends LIC fluid and vent gas thermal energy before arriving at the reservoir 240. Thermal fluid loop's primary coolant outlet section, for example, has a total (first) conduit length L1, e.g., an end-to-end length of the coolant outlet manifold and conduit 250, 252, that extends from the battery case 202 to the coolant reservoir 240. Thermal fluid loop's secondary coolant outlet section, on the other hand, has a total (second) conduit length L2, e.g., an end-to-end length of the auxiliary vent manifold 254 and auxiliary vent conduit 256, that extends from the battery case 202 to the coolant reservoir 240. The secondary coolant outlet section's total conduit length L2 is markedly larger (e.g., 50-100%+ greater) than the primary coolant outlet section's total conduit length L1 such that thermal energy of the LIC fluid 211 and vent gases 213 is lost to conductive heat transfer, turbulent flow and friction before reaching the main coolant reservoir 240.

In order to maintain a default internal fluid pressure for immersion cooling during ordinary use of the battery module 200, the LIC system 204 may limit or outright preclude fluid flow through the secondary coolant outlet section unless and until onset of a predefined thermal event. According to the illustrated example, the auxiliary vent manifold 254 is fabricated with one or more burst vents, an example of which is shown at 258 within inset view IV1, that physically restrict fluid flow through the auxiliary vent manifold 254 prior to a thermal runaway event. Each burst vent 258 may include or, if desired, may consist essentially of a metallic, or polymer frangible burst disc 259 that is sealingly connected to a fluid port 257 of the auxiliary vent manifold 254. As shown, a series of mutually parallel exhaust runners 265 originate at the battery case 202 and terminate at fluid inlet ports 257 on the vent manifold body 255, selectively fluidly coupling the immersion compartment 201 with the auxiliary vent manifold 254. These fluid inlet ports 257 may each be blocked by a respective burst disc 259 that is sealed over the port's opening. The frangible burst disc 259 is scored, slotted, notched, thinned, or otherwise structurally configured to fail at a predefined internal compartment pressure of the immersion compartment 201. By way of non-limiting example, the frangible burst disc 259 may be a thin aluminum foil that is designed to rip open at a predefined thermal runaway pressure (e.g., a 3-bar TR onset pressure) inside the immersion compartment 201. When the burst discs 259 fail, LIC fluid 211 and vent gases 213 are allowed to flow into and through the auxiliary vent manifold 254 to the coolant reservoir 240. It is also within the scope of this disclosure to utilize other fluid flow restrictions and obstructions, which may be located at any functionally suitable location within the LIC system 204.

Packaged downstream from the auxiliary manifold 254 and battery case 202 are one or more gas valves 260, each of which is fluidly connected to the main coolant reservoir 240 and actively/passively activated to evacuate vent gases from the LIC system 204. In the representative LIC architecture of FIG. 4, a passive-type, spring-biased gas release valve 260 is mounted onto the coolant reservoir 240 and opened by gas pressures at or above a predefined internal pressure within the reservoir 240 to thereby expel vent gases 213 to the surrounding environment. At least one gas valve 260 may be fastened directly to the reservoir cover 243, at least partially disposed within a reservoir gas vent 245 that extends through the cover 243, as best seen in the inset view IV2. The gas valve 260 may be a pressure-activated flapper valve with a flapper diaphragm 261 that seats onto an exterior surface of the coolant reservoir cover 243; when seated, the diaphragm 261 circumscribes and fluidly seals the gas vent 245. The flapper diaphragm 261 is biased closed by a helical expansion spring 263 or other functionally suitable biasing mechanism. When fluid pressure inside the main coolant reservoir 240 exceeds the spring force of the expansion spring 263, the flapper diaphragm 261 is unseated from the reservoir cover 243 to expose the gas vent 245. Unseating the gas valve 260 opens the gas vent 245, which allows vent gases 213 to empty from the main coolant reservoir 240 and, for automotive applications, expel from the vehicle body. In addition, the auxiliary vent conduit 256 fluidly connects a fluid outlet port of the auxiliary vent manifold 254 to an upper portion of the reservoir body such that the LIC fluid 211 separates from the vent gases 213 and drains into the reservoir basin 241.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined, for example, by the appended claims. Moreover, the present concepts expressly include any and all combinations and subcombinations of the preceding elements and features.

What is claimed:

1. An active thermal management (ATM) system for a battery assembly, the battery assembly including a battery case with a liquid-tight immersion compartment containing a battery cell and configured to hold a liquid immersion cooling (LIC) fluid, the ATM system comprising:
    a coolant reservoir defining therein a single fluid compartment configured to stow therein both the LIC fluid and vent gases of the battery cell;
    a coolant inlet manifold configured to fluidly connect the coolant reservoir to the battery case and transfer the LIC fluid into the immersion compartment;
    a coolant outlet manifold configured to fluidly connect the battery case to the coolant reservoir and transfer the LIC fluid out from the immersion compartment and into the single fluid compartment of the coolant reservoir;
    an auxiliary vent manifold configured to selectively fluidly connect the battery case to the coolant reservoir responsive to a predefined thermal event and thereby transfer the LIC fluid and the vent gases of the battery cell from the immersion compartment into the single fluid compartment of the coolant reservoir; and
    a gas valve fluidly connected to the coolant reservoir and configured to selectively evacuate therefrom the vent gases at a predefined internal reservoir pressure.

2. The ATM system of claim 1, wherein the coolant outlet manifold includes a first cylindrical manifold body having a first diameter, and the auxiliary vent manifold includes a second cylindrical manifold body having a second diameter greater than the first diameter.

3. The ATM system of claim 1, wherein the coolant outlet manifold has a first total conduit length from the battery case to the coolant reservoir, and the auxiliary vent manifold includes a second total conduit length, greater than the first total conduit length, from the battery case to the coolant reservoir.

4. The ATM system of claim 1, wherein the auxiliary vent manifold includes a burst vent configured to restrict fluid flow through the auxiliary vent manifold to the coolant reservoir prior to the predefined thermal event.

5. The ATM system of claim 4, wherein the burst vent includes a frangible burst disc seated inside and sealing a fluid port defined in the auxiliary vent manifold, the frangible burst disc being configured to rupture at a predefined internal compartment pressure of the immersion compartment.

6. The ATM system of claim 5, wherein the fluid port is a fluid inlet port interposed between the auxiliary vent manifold and the immersion compartment, and wherein the frangible burst disc is sealed over the fluid inlet port.

7. The ATM system of claim 1, wherein the gas valve includes a passive-type, spring-biased valve.

8. The ATM system of claim 7, wherein the coolant reservoir includes a reservoir body with a reservoir basin, within which is stowed the LIC fluid, and a reservoir cover extending across and closing the reservoir basin, and wherein the gas valve is mounted to the reservoir cover.

9. The ATM system of claim 8, wherein the auxiliary vent manifold includes a fluid outlet port fluidly connected via a vent conduit to an upper portion of the reservoir body such that the LIC fluid separates from the vent gases and drains into the reservoir basin.

10. The ATM system of claim 1, further comprising a liquid pump fluidly connected to the coolant reservoir and configured to circulate the LIC fluid through the coolant inlet manifold and into the battery case to thereby at least partially submerge the battery cell in the LIC fluid.

11. The ATM system of claim 1, wherein the battery assembly is a traction battery pack mounted to a vehicle, and wherein the gas valve evacuates the vent gases from the vehicle.

12. The ATM system of claim 11, wherein the vehicle includes a heat-generating powertrain component, and wherein the ATM system includes fluid conduits configured to fluidly connect the coolant reservoir to the heat-generating powertrain component to transfer thereto the LIC fluid.

13. The ATM system of claim 1, wherein the predefined thermal event includes a thermal runaway (TR) event with a resultant TR fluid pressure within the immersion compartment causing the auxiliary vent manifold to fluidly connect the battery case to the coolant reservoir.

14. A motor vehicle, comprising:
    a vehicle body;
    a plurality of road wheels attached to the vehicle body;
    a traction motor attached to the vehicle body and operable to drive one or more of the road wheels to thereby propel the motor vehicle;
    a traction battery pack attached to the vehicle body and electrically connected to the traction motor, the traction battery pack including a battery case defining therein a liquid-tight immersion compartment containing a plurality of lithium-class battery cells at least partially submerged in a liquid immersion cooling (LIC) fluid; and
    an active thermal management (ATM) system, including:
        a coolant reservoir defining therein a single fluid compartment stowing therein the LIC fluid and vent gases emitted by the lithium-class battery cells;

a coolant inlet manifold fluidly connecting the coolant reservoir to the battery case and configured to transfer the LIC fluid into the immersion compartment;

a coolant outlet manifold fluidly connecting the battery case to a first location of the coolant reservoir and configured to transfer the LIC fluid out from the immersion compartment and into the single fluid compartment;

an auxiliary vent manifold configured to selectively fluidly connect the battery case to a second location of the coolant reservoir, distinct from the first location, responsive to a predefined thermal event and thereby transfer the LIC fluid and the vent gases generated by the lithium-class battery cells from the immersion compartment into the single fluid compartment of the coolant reservoir; and a gas valve mounted onto a third location of the coolant reservoir, above the first and second locations, and configured to selectively evacuate therefrom the vent gases at a predefined internal reservoir pressure.

15. A method of assembling an active thermal management (ATM) system for regulating an operating temperature of a battery assembly, the battery assembly including a battery case with a liquid-tight immersion compartment containing a battery cell and configured to hold a liquid immersion cooling (LIC) fluid, the method comprising:

receiving a coolant reservoir configured to stow therein both the LIC fluid and vent gases of the battery cell;

fluidly connecting the coolant reservoir to the battery case via a coolant inlet manifold, the coolant inlet manifold configured to transfer the LIC fluid from the coolant reservoir into the immersion compartment;

fluidly connecting the battery case to the coolant reservoir via a coolant outlet manifold, the coolant outlet manifold configured to transfer the LIC fluid out from the immersion compartment and into the coolant reservoir;

selectively fluidly connecting the battery case to the coolant reservoir responsive to a predefined thermal event via an auxiliary vent manifold, the auxiliary vent manifold configured to transfer the LIC fluid and vent gases generated by the battery cell from the immersion compartment into the coolant reservoir; and fluidly connecting a gas valve to the coolant reservoir, the gas valve configured to selectively evacuate the vent gases from the coolant reservoir at a predefined internal reservoir pressure.

16. The method of claim 15, wherein the coolant outlet manifold includes a first cylindrical manifold body having a first diameter, and the auxiliary vent manifold includes a second cylindrical manifold body having a second diameter greater than the first diameter.

17. The method of claim 15, wherein the coolant outlet manifold has a first total conduit length from the battery case to the coolant reservoir, and the auxiliary vent manifold includes a second total conduit length, greater than the first total conduit length, from the battery case to the coolant reservoir.

18. The method of claim 15, wherein the auxiliary vent manifold includes a burst vent with a frangible burst disc restricting fluid flow through the auxiliary vent manifold to the coolant reservoir prior to the predefined thermal event.

19. The method of claim 15, wherein the gas valve includes a passive-type, spring-biased valve mounted to the coolant reservoir.

20. The method of claim 15, further comprising fluidly connecting a liquid pump to the coolant reservoir, the liquid pump configured to circulate the LIC fluid through the coolant inlet manifold and into the battery case to thereby at least partially submerge the battery cell in the LIC fluid.

* * * * *